United States Patent Office 2,913,688
Patented Nov. 17, 1959

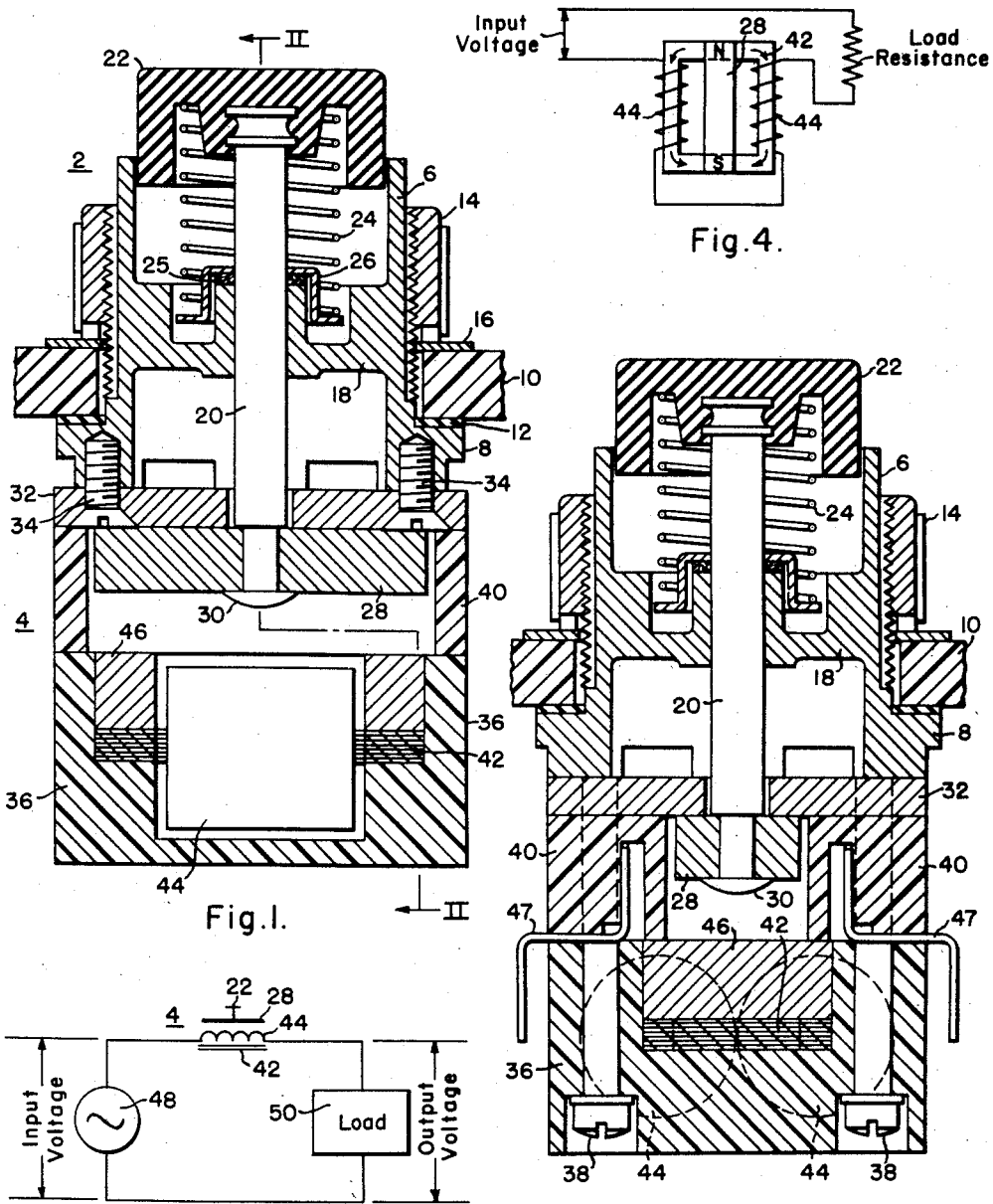

2,913,688

SWITCHING DEVICES

Thomas W. Slebodnik, Beaver, and Frank J. Rau, Pittsburgh, Pa., assignors to Westinghouse Electric Corporation, East Pittsburgh, Pa., a corporation of Pennsylvania Application June 28, 1956, Serial No. 594,411

6 Claims. (Cl. 336—110)

Our invention relates, generally, to switching devices and, more particularly, to switching devices of the saturable reactor type.

An object of our invention is to provide a contactless switch of the saturable reactor type suitable for utilization in control systems having magnetic logic elments.

Another object of our invention is to provide a switch which is made suitable for utilization in explosive atmospheres by elimnating arcing contacts.

A further object of our invention is to provide a switch suitable for utilization in relatively low voltage control circuits.

Still another object of our invention is to provide a switch which is of oil-tight construction, and which is not adversely affected by wear or arcing of contact members.

A more general object of our invention is to provide a contactless switch which shall be simple and efficient in operation and which may be economically manufactured and installed.

Other objects of our invention will be explained fully hereinafter or will be apparent to those skilled in the art.

In accordance with one embodiment of our invention, coils of a saturable reactor are connected in series with an alternating current source and a load circuit. The output voltage applied to the load circuit is varied from "on" to "off" by varying the inductance of the reactor. When the reactor is unsaturated most of the line voltage is absorbed by the reactor. This condition corresponds to the "off" position of a switch of the contact or blade type. When an output voltage is desired across the load, the reactor core is saturated by placing a permanent magnet across the reactor thereby reducing the impedance of the reactor and permitting most of the line voltage to appear across the load circuit. This corresponds to the "on" position of a switch of the contact type.

For a better understanding of the nature and objects of the invention, reference may be had to the following detailed description, taken in conjunction with the accompanying drawing, in which:

Figure 1 is a view, in longitudinal section, of a switching device embodying the principal features of the invention;

Fig. 2 is a view, in section, taken along the line II—II of Fig. 1;

Fig. 3 is a diagrammatic view of a switching system utilizing the switching device shown in Figs. 1 and 2, and Fig. 4 is a diagrammatic view of the reactor utilized in the switching device.

Referring to the drawing, and particularly to Figs. 1 and 2, the switch structure shown therein comprises an operating unit 2 and a reactor unit 4. The operating unit 2 is of oil-tight construction and includes a tubular supporting sleeve 6 preferably of a cast metal and having a flange 8 on the inner end thereof adapted to engage the inner side of a supporting panel 10. A sealing disc 12 composed of any desirable sealing material, such as rubber, may be interposed between the flange 8 and the inner side of the panel 10.

A portion of the sleeve 6 is threaded for receiving a clamping ring 14 which is adapted to secure the sleeve to the panel 10 when the clamping ring is drawn up tightly. A nameplate or washer 16 may be provided between the clamping ring 14 and the panel 10.

The supporting sleeve 6 of the switch operating unit has a transversely extending web 18 having a central opening therein for slidably receiving an operating rod 20. An operating head 22 of the push button type composed of an insulating material is secured to the outer end of the operating rod 20, preferably by being molded thereon. A compression spring 24 is disposed between the operating head 22 and a retainer disc 26 seated on web 18 to normally bias the operating head 22 to the outer limit of its movement. A sealing washer 25 is provided between the retainer disc 26 and the web 18 to prevent entrance of liquids along the rod 20.

The outer movement of the operating head 22 is limited by a permanent magnet 28 which is attached to the lower end of the operating rod 20 by riveting at 30. As shown, the magnet 28 engages a keeper 32 which is composed of iron or other magnetic material and is attached to the bottom of the sleeve 6 by screws 34.

The reactor unit 4 comprises a base 36 composed of insulating material which is attached to the keeper 32 by screws 38. An insulating spacer 40 is disposed between the base 36 and the keeper 32. A hollow rectangular core 42 composed of a plurality of laminations of magnetic material is mounted in the base 36. A coil 44 is mounted on each one of two opposite legs of the core 42. A pole piece 46 composed of magnetic material is provided at each end of the rectangular core 42. As shown in Fig. 4, the two coils 44 are connected in series-circuit relation. Terminal members 47 are provided for making external connections to the coils 44.

As shown in Fig. 3, the coils of the reactor unit 4 may be connected in series with a source of alternating current 48 and a load circuit 50. In the normal or "off" position the permanent magnet 28 is held away from the reactor assembly against the iron keeper 32 by the spring 24. In this normal or "off" position most of the flux generated by the magnet is shunted by the iron keeper 32 and the coils 44 and core 42 function as an iron core reactor. When the coils are connected in series with the load circuit and an alternating current voltage is applied across the circuit as shown in Fig. 3, most of the voltage drop will appear across the reactor unit and little voltage will appear across the load when the permanent magnet is held away from the reactor unit.

When the pushbutton 22 is depressed, the permanent magnet 28 will touch the pole pieces 46 which are in contact with the reactor core 42. The flux from the permanent magnet 28 will then pass through the reactor core. As shown in Fig. 4, the flux from the permanent magnet divides so that half of it flows through each leg of the core. Since the windings for the coils 44 are in series around the core the D.C. flux aids in saturating only half of the core at any given instant, the other half of the core remaining unsaturated. However, the winding on the unsaturated leg of the core does not present an appreciable impedance in the circuit because of the large effective air gap in the core produced by the saturated leg of the core. The permanent magnet itself has a permeability of about four so that it also acts as a large air gap.

Therefore, the impedance of the reactor when the button 22 is depressed is low and most of the voltage drop in the circuit will appear across the load. This condition corresponds to the "on" or "closed" position of a switch of the contact or blade type. In this manner the output voltage can be switched from a relatively low value when the push button is in the normal or "off" position to a high value almost equal to the applied voltage when the push button is depressed to the "on" position.

From the foregoing description, it is apparent that we have provided a switching device which is relatively simple in construction. The present device provides a means for switching alternating current electrical circuits without contact members, thereby obtaining more reliable operation by eliminating contact deterioration from wear or arcing and by providing positive operation at a relatively low voltage by precluding the possibility of dirty contact members or worn mechanical parts. The present switch may be utilized in control systems having magnetic logic elements. It is also particularly advantageous for utilization in explosive atmospheres since the possibility of arcing at contact members is precluded.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a switching device, in combination, a core composed of a magnetic material, coils disposed on opposite legs of said core, a keeper composed of magnetic material spaced from the core, a magnet movable between the keeper and the core from a position out of the magnetic circuit for the core to a position in said magnetic circuit to aid said coils in saturating said core, manually operable means for actuating the magnet quickly in one direction, and spring means for biasing the magnet in the opposite direction.

2. In a switching device, in combination, a hollow rectangular core composed of a plurality of laminations of magnetic material, coils disposed on opposite legs of said core, said coils being connected in series-circuit relation, a pole piece at each end of the core, a magnet, a keeper composed of magnetic material, said keeper being spaced from said core and said pole pieces, and means for moving said magnet quickly from a position adjacent to said keeper to a position adjacent to said pole pieces to aid said coils in saturating said core.

3. In a switching device, in combination, a hollow rectangular core composed of a plurality of laminations of magnetic material, coils disposed on opposite legs of said core, said coils being connected in series-circuit relation, a pole piece at each end of the core, a permanent magnet, a keeper composed of magnetic material, said keeper being spaced from said core and said pole pieces, means for moving said magnet quickly from a position adjacent to said keeper to a position adjacent to said pole pieces to aid said coils in saturating said core, and spring means for biasing the magnet to the position adjacent to the keeper.

4. In a switching device adapted to be attached to a supporting panel, in combination, a generally tubular sleeve having a flange at one end and a transverse web inside the sleeve, a clamping ring threaded on the outside of the sleeve for clamping the supporting panel between the ring and the flange on the sleeve, a keeper composed of magnetic material attached to the sleeve, an operating rod slidably disposed in said web and having one end extending through said keeper, a magnet attached to said one end of the rod, a reactor comprising a core of magnetic material supported by said sleeve and a coil disposed on said core, and operating means on the other end of said rod for moving said magnet from a position adjacent to said keeper to a position in the magnetic circuit for said core to aid said coil in saturating said core.

5. In a switching device adapted to be attached to a supporting panel, in combination, a generally tubular sleeve having a flange at one end and a transverse web inside the sleeve, a clamping ring threaded on the outside of the sleeve for clamping the supporting panel between the ring and the flange on the sleeve, a magnetic keeper attached to the sleeve, an operating rod slidably disposed in said web and having one end extending through said keeper, a magnet attached to said one end of the rod, a reactor comprising a core of magnetic material supported by said sleeve and a coil disposed on said core, operating means on the other end of said rod for moving said magnet from a position adjacent to said keeper to a position in the magnetic circuit for said core to aid said coil in saturating said core, and a spring disposed between said operating means and said web for biasing said magnet to its position adjacent to said keeper.

6. In a switching device adapted to be attached to a supporting panel, in combination, a generally tubular sleeve having a flange at one end and a transverse web inside the sleeve, a clamping ring threaded on the outside of the sleeve for clamping the supporting panel between the ring and the flange on the sleeve, a magnetic keeper attached to the sleeve, an operating rod slidably disposed in said web and having one end extending through said keeper, a magnet attached to said one end of the rod, a reactor comprising a core of magnetic material supported by the sleeve and a coil disposed on said core, pole pieces at opposite ends of said core, and operating means on the other end of said rod for moving said magnet from a position adjacent to said keeper to a position adjacent to said pole pieces to aid said coil in saturating said core.

References Cited in the file of this patent

UNITED STATES PATENTS

| | | |
|---|---|---|
| 1,374,193 | Ford | Apr. 12, 1921 |
| 2,290,825 | Landon | July 21, 1942 |
| 2,380,242 | Jewell | July 10, 1945 |
| 2,381,763 | McCreary | Aug. 7, 1945 |
| 2,653,254 | Spitzer et al. | Sept. 22, 1953 |
| 2,710,952 | Steagall | June 14, 1955 |
| 2,717,965 | Ramey | Sept. 13, 1955 |
| 2,736,869 | Rex | Feb. 28, 1956 |
| 2,802,140 | Mattingly | Aug. 6, 1957 |